US010320219B2

(12) United States Patent
Dutra et al.

(10) Patent No.: US 10,320,219 B2
(45) Date of Patent: Jun. 11, 2019

(54) DYNAMIC POWER CONTROL CIRCUIT

(71) Applicant: MICROSOFT TECHNOLOGY LICENSING, LLC, Redmond, WA (US)

(72) Inventors: Jonathan Alan Dutra, Saratoga, CA (US); Junius Mark Penny, Ben Lomond, CA (US); David Carl Wyland, Richmond, CA (US); David Lukofsky, San Francisco, CA (US); Agustya Ruchir Mehta, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 435 days.

(21) Appl. No.: 15/055,479

(22) Filed: Feb. 26, 2016

(65) Prior Publication Data
US 2017/0250556 A1   Aug. 31, 2017

(51) Int. Cl.
   *H02J 7/00*   (2006.01)
(52) U.S. Cl.
   CPC .......... *H02J 7/0081* (2013.01); *H02J 7/0031* (2013.01)
(58) Field of Classification Search
   USPC .................................................. 320/160–167
   See application file for complete search history.

(56) References Cited

U.S. PATENT DOCUMENTS

| 7,710,079 B2 | 5/2010 | Martin et al. |
| 7,733,061 B2 | 6/2010 | Zemke et al. |
| 8,988,912 B2 | 3/2015 | Tofigh et al. |
| 2007/0018502 A1 | 1/2007 | Bazinet |

(Continued)

FOREIGN PATENT DOCUMENTS

| EP | 2448083 A2 | 5/2012 |
| WO | 9926330 A2 | 5/1999 |
| WO | WO2014/0887768 | 6/2014 |

OTHER PUBLICATIONS

Armstrong, Tony, "ASSP Optimises Handheld Power", Published on: Jul. 1, 2007 Available at: http://www.controlengeurope.com/article.aspx?ArticleID=13137, 2 pages.

(Continued)

*Primary Examiner* — Binh C Tat
(74) *Attorney, Agent, or Firm* — Newport IP, LLC; Scott Y. Shigeta

(57) ABSTRACT

A dynamic power control circuit is provided. The control circuit can detect the presence of the external power source as well as detect one or more conditions of the device. For instance, the control circuit can detect a voltage difference between a first node coupling a first power output and a system circuit and a second node coupling a second power output and the batteries. The control circuit can also detect the activation or deactivation of the external power source. Based on the inputs, the control circuit can cause the controlled resistor to dynamically adjust a level of impedance between the first node and the second node. The controlled impedance between the first node and the second node enables the system circuit to dynamically utilize power supplied by the external power source as well as power supplied by the batteries.

10 Claims, 7 Drawing Sheets

(56) References Cited

U.S. PATENT DOCUMENTS

| | | | |
|---|---|---|---|
| 2008/0169706 A1* | 7/2008 | Onishi | H02J 7/025 307/104 |
| 2009/0261798 A1 | 10/2009 | Sachdev et al. | |
| 2010/0013321 A1* | 1/2010 | Onishi | G08C 17/04 307/104 |
| 2010/0237840 A1 | 9/2010 | Walter et al. | |
| 2012/0139345 A1 | 6/2012 | Ye et al. | |
| 2013/0076301 A1* | 3/2013 | Bastami | H02J 7/0008 320/107 |
| 2014/0070618 A1* | 3/2014 | Bajaj | H02J 7/0052 307/66 |

OTHER PUBLICATIONS

Badam, et al., "Software Defined Batteries", In Proceedings of the 25th Symposium on Operating Systems Principles, Oct. 4, 2015, pp. 1-15.

Bishop, Andy, "3-in-1 Device Replaces Battery Charger, Overvoltage Protection and PowerPath Manager for USB/Battery Powered Devices", In Linear Technology Magazine, Jun. 2007, 3 pages.

Gurries, Mark, "Dual Battery Power Manager Increases Run Time by 12% and Cuts Charge Time in Half", In Linear Technology Magazine, Feb. 2002, 2 pages.

Linear.com, "Battery Charging and Management Solutions", Published on: Aug. 2, 2015 Available at: http://cds.linear.com/docs/en/solutions- manual/Linear_BatteryChargerBrochure 2015_7_3.pdf, published Aug. 2, 2015, 48 pages.

Linear.com, "High Efficiency I2 C USB Power Manager & Li-Ion Charger Provides Digital Control & Status Readback", In Linear Technology Magazine, Dec. 1, 2008, 3 pages.

Linear.com, "Single-IC USB Power Manager, Ideal Diode Controller & Battery Charger for Portable USB Devices", In Linear Technology Magazine, May 25, 2006, 2 pages.

PCT/US2017/018022—International Search Report and Written Opinion, dated Jun. 8, 2017, 16 pages.

* cited by examiner

DYNAMIC POWER CONTROL CIRCUIT

BACKGROUND

Many developments have been made to improve the way batteries are used in mobile devices. For instance, some charging circuits have been developed to enable a single battery charger to supply power for device operation while also providing an independent power source to charge the device batteries. Although there have been some improvements with respect to such circuits, there are many shortcomings and inefficiencies with respect to current technologies. For example, some current charging circuits have a limited number of mechanisms for addressing situations where a high level of current is needed for device operation. Such designs can lead to inefficiencies and/or prevent a device from using the full capacity of a power source.

The disclosure made herein is presented with respect to these and other considerations. It is with respect to these and other considerations that the disclosure made herein is presented.

SUMMARY

A dynamic power control circuit is provided and described herein. In some configurations, an apparatus can include a system circuit, one or more batteries, a control circuit, and a controlled resistor. The system circuit can include any circuit that creates a load, such as the main components of a mobile device, e.g., one or more processors, memory, display screen, and radio. The apparatus is configured to receive power from two different outputs of an external power source: a system output coupled to the system circuit via a first node, and a charge output coupled to the batteries via a second node. The control circuit can detect one or more conditions of the device, such as an activation, e.g., utilization, of the external power source. In other examples, the control circuit can detect a voltage difference between the first node and the second node, or detect a level and/or a direction of current between components. As described herein, based at least in part on one or more detected conditions, e.g., an activation of the external power source and/or various voltage levels, the control circuit can cause the controlled resistor to adjust a level of impedance between the first node and the second node. The controlled impedance between the first node and the second node enables the system circuit to dynamically utilize power supplied by the external power source as well as power supplied by the batteries. The controlled impedance can create a more direct path between the system circuit and the batteries when one or more conditions are present. The techniques disclosed herein provide a design that can mitigate inefficiencies by reducing a resistive path between the batteries and the system circuit.

It should be appreciated that the above-described subject matter may also be implemented as part of an apparatus, system, or as part of an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a wattage, current, voltage, or data signal. The terms, "gate," "drain," and "source," can also mean a "base," "collector" and "emitter," and/or equivalent parts.

Figure 1:
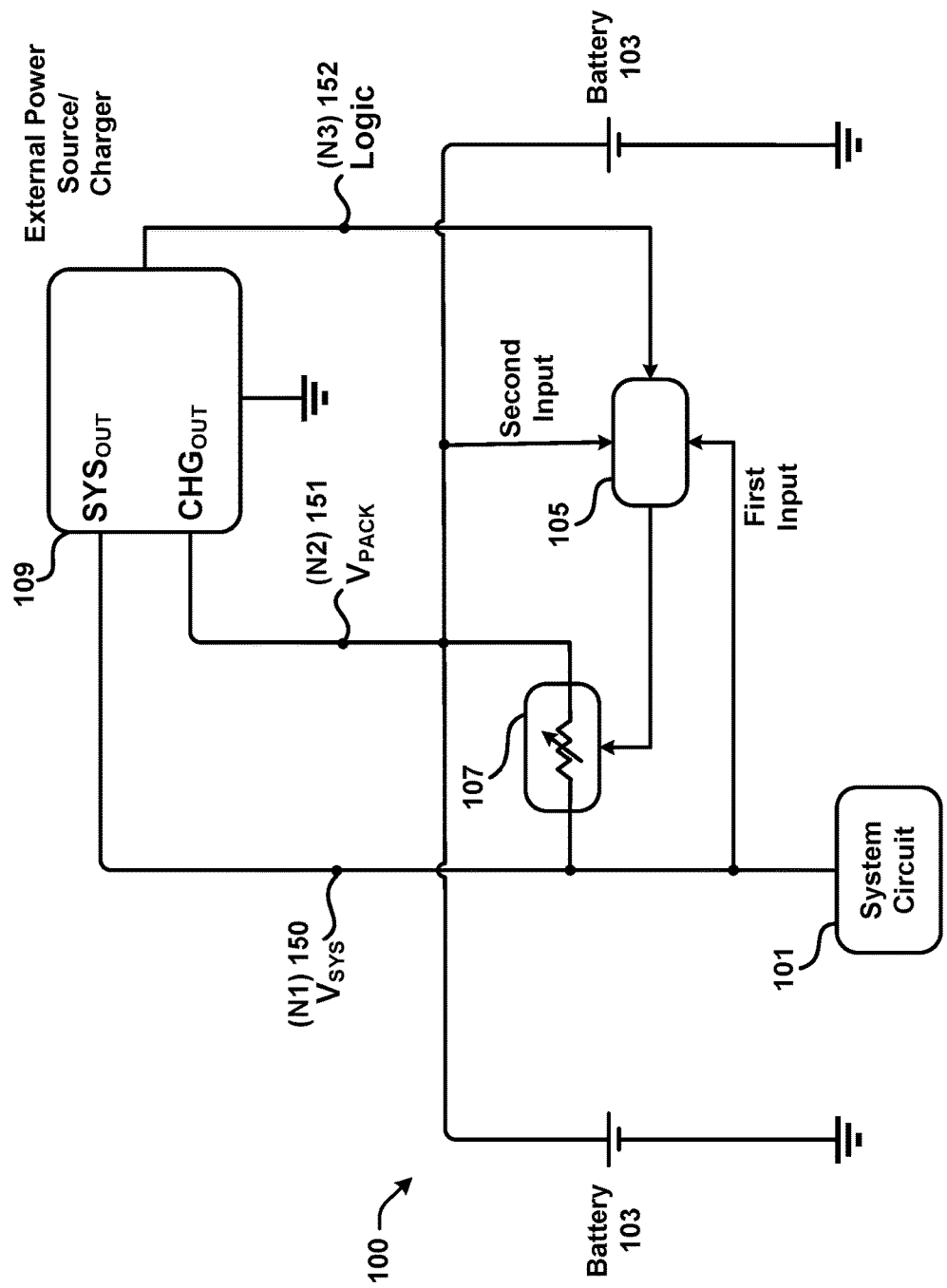
FIG. 1 shows a schematic diagram of an apparatus comprising a dynamic power control circuit.

Referring to FIG. 1, an apparatus 100 can include a system circuit 101, one or more batteries 103, a control circuit 105, and a controlled resistor 107. The system circuit 101 can, for example, include the components of a device, e.g., a processor, memory, and radio, or any other components that create a load. The apparatus 100 is configured to receive power from at least two different outputs of an external power source 109: (1) a system output ($SYS_{OUT}$) coupled to the system circuit 101 via a first node 150 ($V_{SYS}$), and (2) a charge output ($CHG_{OUT}$) coupled to the batteries 103 via a second node 151 ($V_{PACK}$). The control circuit 105 can detect one or more conditions, such as the activation of the external power source 109. The one or more conditions can also include a voltage difference between the first node 150 and the second node 151. In other examples, the control circuit 105 can also detect one or more current levels and/or current directions between selected nodes. As will be described in more detail below, based at least in part on the detected conditions, the control circuit 105 can control the connectivity, e.g., a level of impedance, between the first node 150 and the second node 151. Controlled connectivity between the first node 150 and the second node 151 enables the system circuit 101 to dynamically utilize power supplied by the external power source 109 as well as power supplied by the batteries 103 by the use of a controlled path of impedance that can react to one or more detected conditions.

Figure 2A:
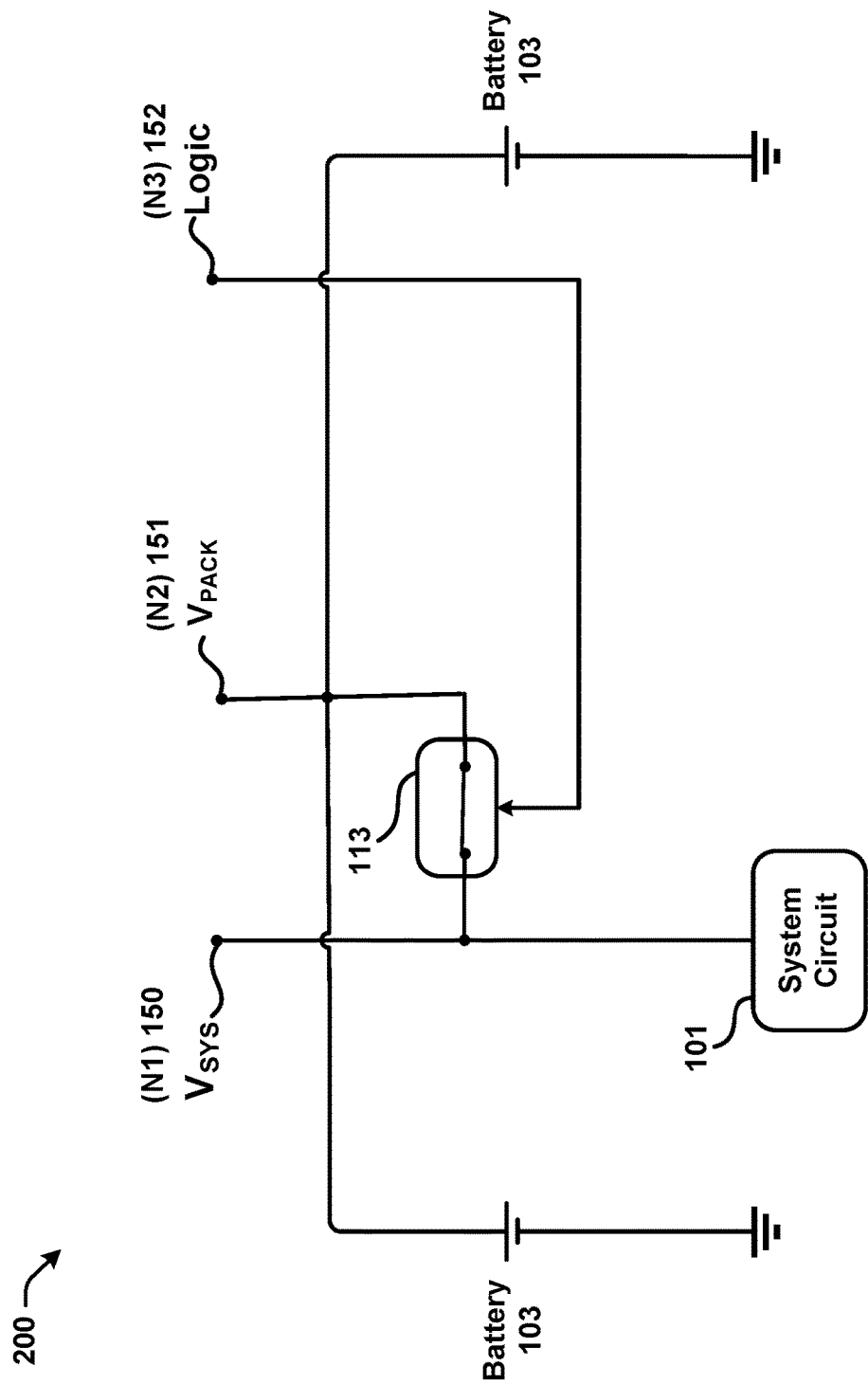
FIGS. 2A-2C show schematic diagrams of an apparatus comprising a switch having a single logical input.
Figure 2B:
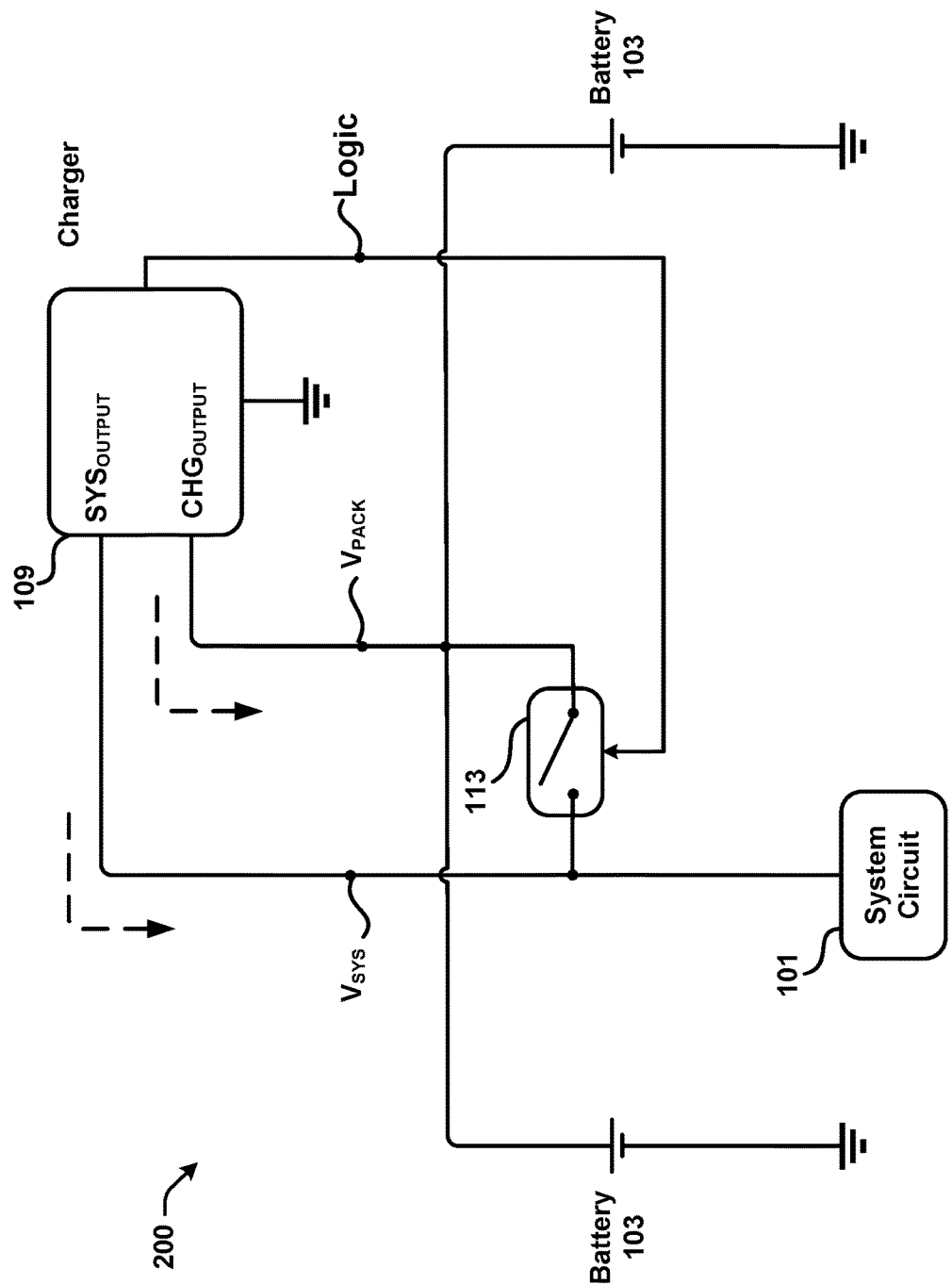
Figure 2C:
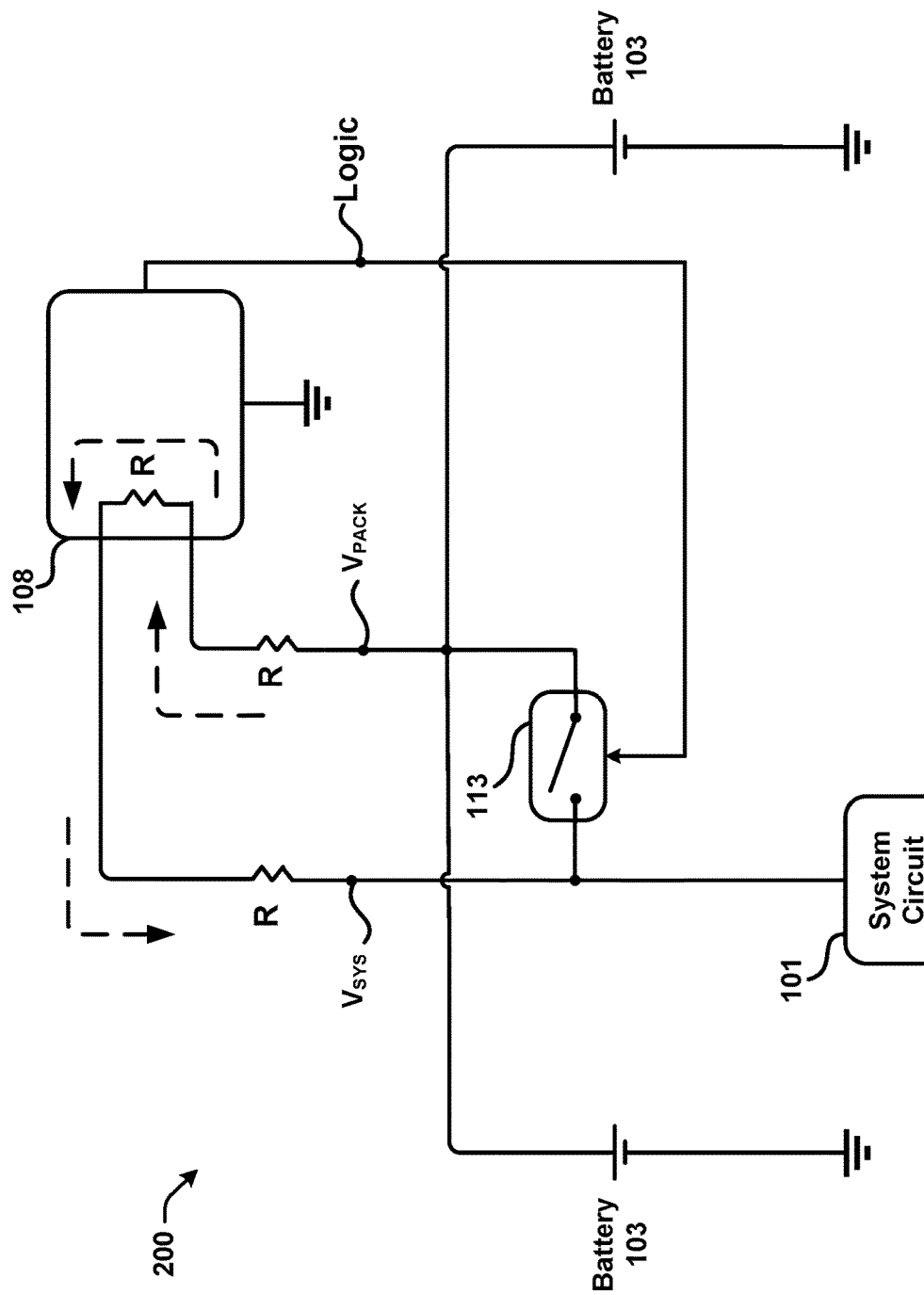

To illustrate aspects of the techniques disclosed herein, FIGS. 2A-2C show several use scenarios of an apparatus 200 comprising a switch 113 having a single logical input. In this example, the switch 113 controls the connectivity between one or more batteries 103 and a system circuit 101. As shown in FIG. 2A, when the system circuit 101 is in use without the activation of an external power source, the switch 113 connects the first node 150 and the second node 151 to enable the system circuit 101 to utilize power from the batteries 103.

As shown in FIG. 2B, when the external power source 109 is connected to the apparatus 200, power is received from the two different outputs. The system output ($SYS_{OUT}$) is coupled to the first node 150 supplying power to the system circuit 101, and the charge output ($CHG_{OUT}$) is coupled to the second node 151 supplying power to the batteries 103. In this example, when the external power source 109 is connected, the switch 113 creates a high impedance path or an open circuit between the first node 150 and the second node 151 allowing the two outputs of the external power source 109 to independently supply power to the system circuit 101 and the batteries 103.

In some configurations, the switch 113 comprises an input enabling one or more components to control with switch 113 with a logical signal indicating that the external power source 109 is active or inactive. The one or more components generating the logical signal can include the power supply. The logical signal can also be generated by other components such as a universal serial bus component, or any other suitable component for indicating the utilization of the external power source 109. As indicated by the dashed lines, when the external power source 109 is active, the current flows from the external power source 109 to the batteries 103 and the system circuit 101.

In some use scenarios, the system circuit 101 may draw a high level of current that exceeds the capabilities of the external power source 109. In such scenarios, the batteries 103 may supplement the external power source 109 by supplying power to the system circuit 101. This scenario is illustrated in FIG. 2C, where the dashed lines show that current flows from the batteries 103, through the external power source 109, eventually reaching the system circuit 101. As illustrated by the representative resistors (R), such a configuration may cause inefficiencies as the path from the batteries 103 to the system circuit 101 may be lengthy. In addition, such a path can create a high level of resistance which in turn causes unwanted power loss as well as a reduction in the amount of current the batteries 103 can supply to the system circuit 101. The configuration shown in FIGS. 2A-2C illustrate a need for a dynamic control circuit that can react to a wide range of such use scenarios.

Figure 3:
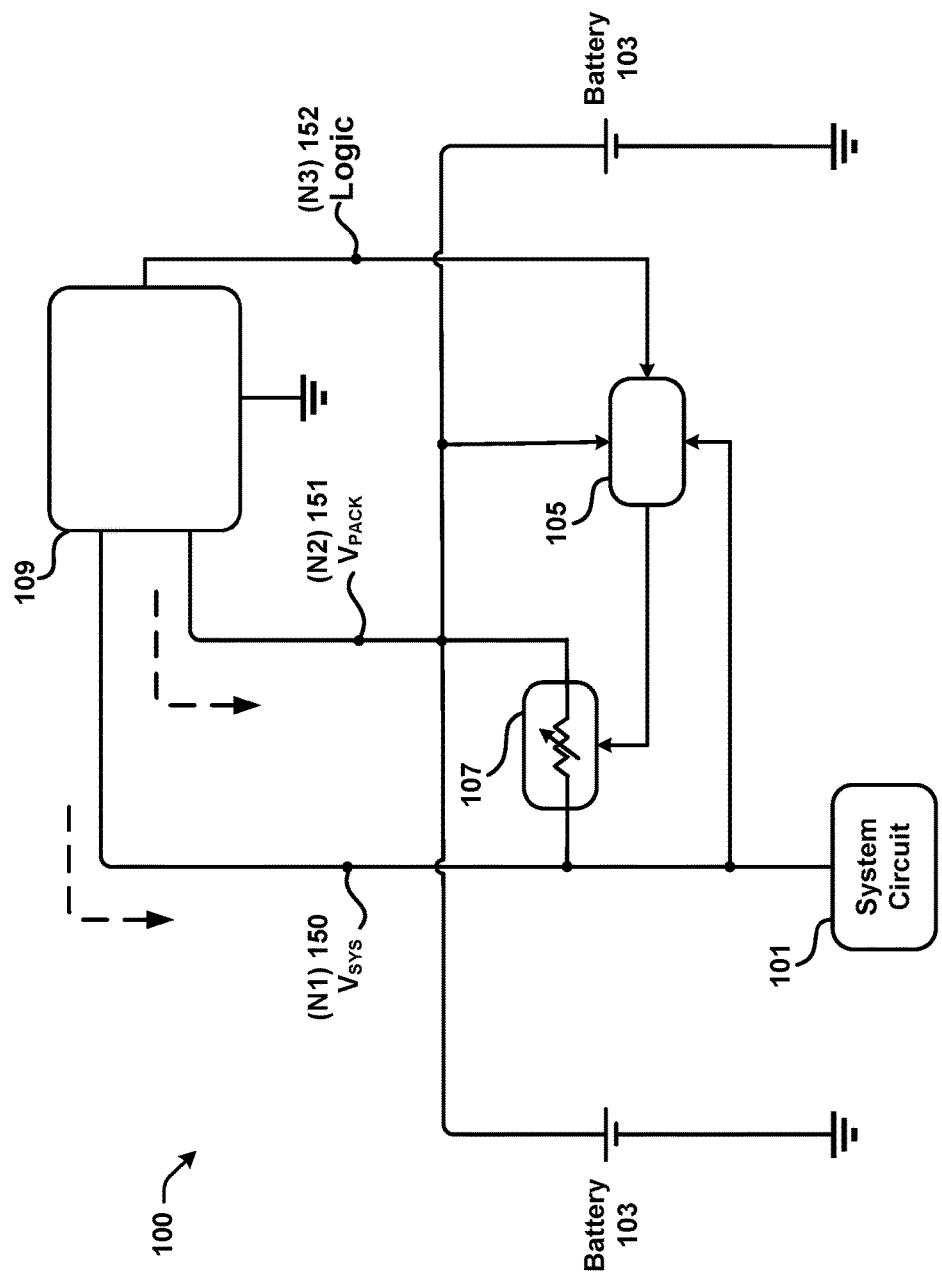
FIG. 3 shows a schematic diagram of an apparatus comprising a dynamic power control circuit in a use scenario.

Referring now to FIG. 3, illustrative examples of several use scenarios for a dynamic power control circuit that is capable of detecting and reacting to one or more conditions of an apparatus 100 are shown and described below. In one illustrative example, the system circuit 101 comprises a positive lead for receiving power at the first node 150 from the first output of the external power source 109. The batteries 103 comprise a positive lead for receiving power at a second node 151 from a second output of the external power source 109. It can be appreciated that this example is provided for illustrative purposes and is not to be construed as limiting. The apparatus 100 can include any number and/or suitable arrangement of components, including any number of system circuits 101 and any number of batteries 103.

The controlled resistor 107 comprises a first lead coupled to the first node 150 and a second lead coupled to the second node 151. The controlled resistor 107 causes a high impedance path between the first node 150 and the second node 151 when the controlled resistor 107 is "off," and the controlled resistor 107 causes a low impedance path between the first node 150 and the second node 151 when the controlled resistor 107 is "on." The controlled resistor 107 further comprises an input for turning the controlled resistor 107 "on" or "off."

The control circuit 105 includes a first input coupled to the first node 150, a second input coupled to the second node 151, a logical input coupled to a third node 152, and an output (also referred to as a "control output") coupled to the input of the controlled resistor 107. The control circuit 105 can receive signals at the first node 150 and the second node 151 to detect one or more conditions. For example, the control circuit 105 can be configured to determine a voltage at the first node 150 and a voltage at the second node 151. The control circuit 105 can also be configured to detect one or more current levels between at least two components.

In addition, the control circuit 105 can be configured to detect a direction of a current between two or more components. To enable such capabilities, one or more coils can be wrapped around a conductor, such as a conductor coupling the external power source 109 and the system circuit 101 and/or a conductor coupling the external power source 109 and the batteries 103. The coils can be coupled to the first input and/or the second input to enable the control circuit 105 to detect one or more current levels and/or one or more current directions.

The one or more components for generating a logical signal indicating that the external power source 109 is active or inactive can be a part of the external power source 109, a connector for the external power source 109, or any other component for detecting the presence and/or use of the external power source 109. The logical signal indicating that the external power source 109 is active or inactive can be communicated through a third node 152 that is independent of the first node 150 and the second node 151. The logical signal indicating that the external power source 109 is active or inactive can also be communicated through the first node 150 and/or the second node 151. In such configurations, a logical signal can be communicated to the first input and/or the second input of the control circuit 105.

The control circuit 105 can be configured to cause the controlled resistor 107 to be "on" when the logical signal at the logical input indicates that the external power source is inactive. For illustrative purposes, the external power source 109 "active" when providing power to one or more components of the apparatus 100, and "inactive" when the external power source 109 is disconnected or not providing power to one or more components of the apparatus 100. Thus, when the external power source 109 is not providing power to one or more components of the apparatus 100, the controlled resistor 107 provides a short circuit or a low impedance path between the first node 150 and the second node 151, allowing the system circuit 101 to operate from the batteries 103.

The control circuit 105 can be configured to cause the controlled resistor 107 to be "off" when the logical signal at the logical input indicates that the external power source is active, and when the voltage at the first node 150 and the voltage at the second node 151 are within a threshold of one another. Such a configuration allows the two outputs of the external power source 109 to independently provide power to the system circuit 101 and the batteries 103.

The control circuit 105 can be configured to cause the controlled resistor 107 to be "on" when the logical signal at the logical input indicates that the external power source is active, and when the voltage at the first node 150 is less than the voltage at the second node 151 by the threshold. For example, while the external power source is active, if the threshold is 40 millivolts, the voltage at the first node 150 is 4.0 volts and the voltage at the second node 151 is 5.0 volts, the control circuit 105 will cause the controlled resistor 107 to be "on." Such a configuration allows the batteries 103 to supplement the power provided by the external power source 109 while using a path of resistance that is shorter and more efficient than the path shown in FIG. 2C.

In some examples, the threshold can be within a range of zero volts to one hundred millivolts. In another illustrative example, the threshold can be approximately forty millivolts, or within a range between thirty-five millivolts and forty-five millivolts. These examples are provided for illustrative purposes and are not to be construed as limiting as any suitable threshold can be utilized with the techniques disclosed herein.

These examples are provided for illustrative purposes, as other conditions and/or criteria can be used to cause the controlled resistor 107 to react to different scenarios. In another example, the control circuit 105 can be configured to cause the controlled resistor 107 to be "off" when the logical signal at the logical input indicates that the external power source is active, and when a first signal at the first input and a second signal at the second input fulfill a first criteria. The control circuit 105 can be configured to cause the controlled resistor 107 to be "on" when the logical signal at the logical input indicates that the external power source is active, and when the first signal at the first input and the second signal at the second input fulfill a second criteria.

The criteria for controlling the controlled resistor 107 can be based on current measurement at the first node 150 leading into the system circuit 101. In such an example, the first criteria can be fulfilled when a current between the external power source 109 and the system circuit 101 is below a threshold. The second criteria can be fulfilled when the current between the external power source 109 and the system circuit 101 is above the threshold.

In some configurations, the first criteria can be fulfilled when a current between the external power source 109 and the at least one battery 103 is flowing in a first direction, e.g., toward the battery 103. In such an example, the second criteria can be fulfilled when the current between the external power source 109 and the at least one battery 103 is flowing in a second direction, e.g., away from the battery 103.

In some configurations, the control circuit 107 can be configured to cause the controlled resistor 107 to vary the level of impedance between the first node 150 and the second node 151 to maintain a predetermined voltage difference between the voltage at the first node 150 and the voltage at the second node 151. Such a configuration can also be implemented with criteria, e.g., the logical signal indicates that the external power source is active and/or when the voltage at the first node 150 is outside of a threshold of the voltage at the second node 151.

In some configurations, when the voltage across the controlled resistor 107 is reverse biased, the controlled resistor 107 is "off" and the impedance through the controlled resistor 107 is high, e.g., an open circuit. In some configurations, when the voltage across the controlled resistor 107 exceeds a threshold voltage, e.g., a range around 30 mV, in a forward direction, the controlled resistor 107 is "on," and the impedance of the controlled resistor 107 is controlled such that the voltage between the first node 150 and the second node 151 is regulated to a threshold voltage difference. In one illustrative example, the threshold voltage difference can be 30 mV. The threshold voltage difference can be at other levels depending on design needs. For illustrative purposes such configurations can be referred to herein as a "linear region," where the controlled resistor 107 is regulating the forward voltage to a desired level, e.g., about 30 mV. If the current through the controlled resistor 107 is so high that the controlled resistor 107 is fully turned "on," then it acts as an switch that is turned on with resistance and the voltage across the controlled resistor 107 is (I*R), which can be greater than the 30 mV set point.

Figure 4:
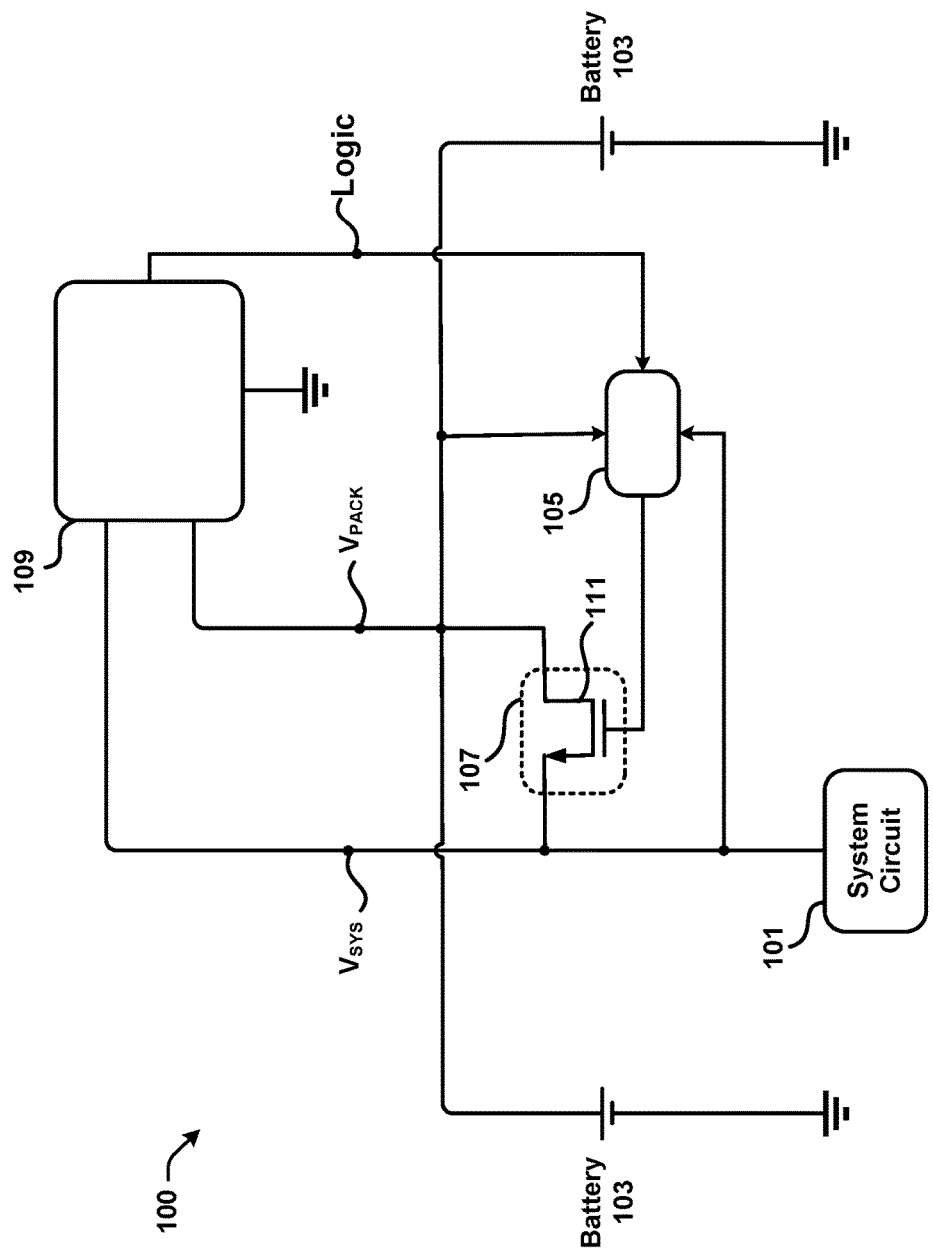
FIG. 4 shows a schematic diagram illustrating details of a controlled resistor controlled by a dynamic power control circuit.

Referring now to FIG. 4, aspects of the controlled resistor 107 are shown and described below. In some configurations, the controlled resistor 107 comprises a transistor 111, such as a field-effect transistor 111. The gate of the transistor 111 is coupled to the output of the control circuit. The source of the transistor 111 is coupled to the first node 150 and the drain of the transistor 111 is coupled to the second node 151. Such configurations, and other configurations, enable the control circuit 105 to cause the controlled resistor 107 to gradually transition the level of impedance between the first node 150 and the second node 151 from a high impedance path to a low impedance path as a difference between the voltage of the first signal and the voltage of the second signal increases. The control circuit 105 can also cause the controlled resistor 107 to gradually transition the level of impedance between the first node 150 and the second node 151 from a low impedance path to a high impedance path as a difference between the voltage of the first signal and the voltage of the second signal decreases. A high impedance path can also be an open circuit and a low impedance path can be a closed circuit.

The controlled resistor 107 can also include other components, such as a pFET or an ideal diode. Any suitable component or combination of components can be used, including a mechanical switch or a combination of parts that include one or more diodes and an Op-amp. In such configurations, a controlled resistor 107 having a forward bias voltage drop close to zero can work with the techniques disclosed herein.

Figure 5:
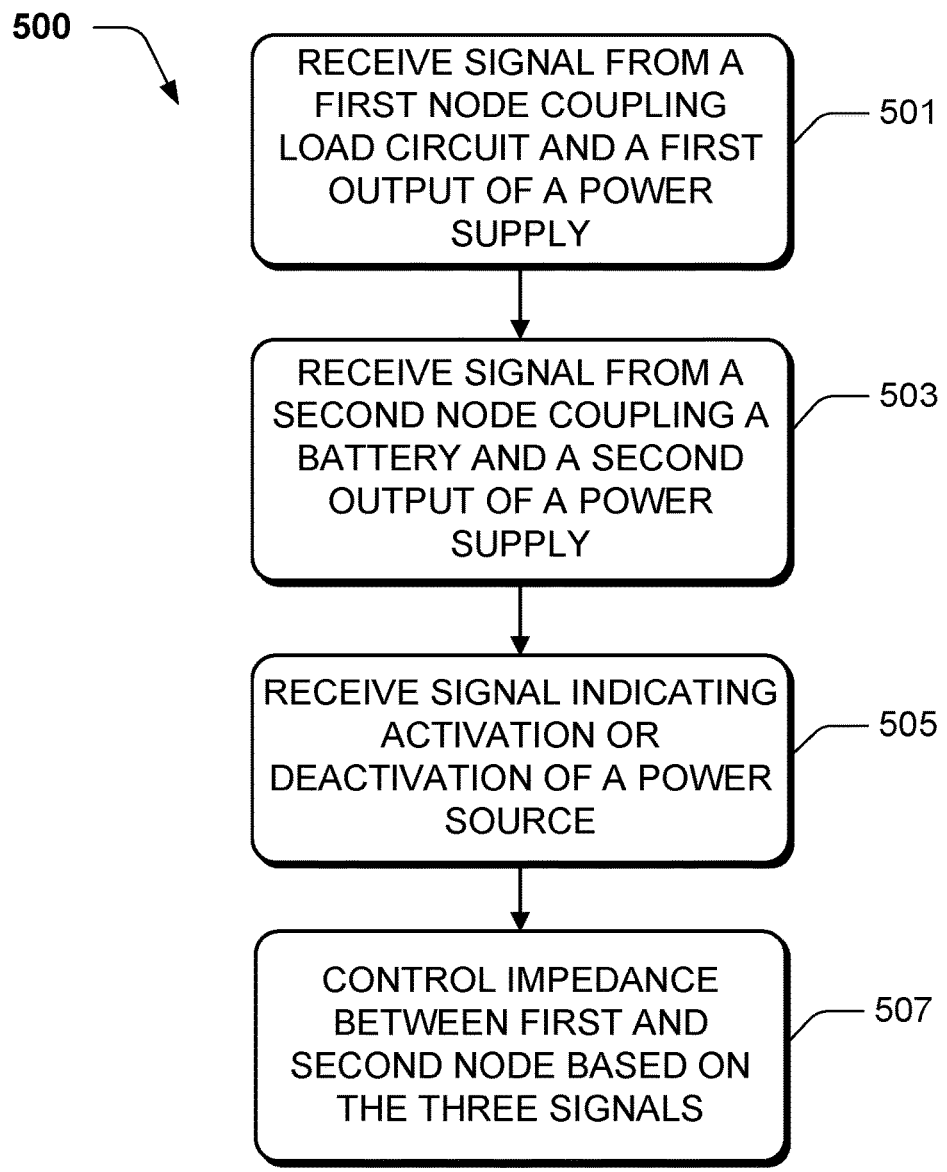
FIG. 5 illustrates a flow chart implementing an example method in accordance with techniques disclosed herein.

FIG. 5 illustrates a flow chart implementing a method 500 in accordance with techniques disclosed herein. Other logical flows can be implemented using the circuits described herein, the logical disclosed herein is provided for illustrative purposes and is not to be construed as limiting. The logical flow described herein can be implemented by an apparatus 100 having a system circuit 101, one or more batteries 103, a control circuit 105, and a controlled resistor 107.

The logical flow starts at block 501, where the control circuit 105 receives a signal from the first node 150 coupled to a positive lead of a system circuit 101 ("load circuit") and the first output of an external power source 109. At block 503, the control circuit 105 receives a signal from the second node 151 coupled to a positive lead of at least one battery 103 and the second output of an external power source 109. At block 505, the control circuit 105 receives a logic signal from the external power source 109. The logic signal can include any type of signal indicating activation or deactivation of the external power source 109.

Next, at block 505, the control circuit 105 and the controlled resistor 107 control an impedance path between the first node 150 and the second node 151. As described herein, the impedance path between the first node 150 and the second node 151 can be adjusted in a number of ways depending on a desired outcome. For example, the impedance path can be a short circuit or a low impedance path when the external power source 109 is not active. The impedance path can be an open circuit or a high impedance path when the logical signal at the logical input indicates that the external power source 109 is active, and when the voltage at the first node 150 and the voltage at the second node 151 are within a threshold of one another. In addition, the impedance path can be a short circuit or a low impedance path when the logical signal indicates that the external power source 109 is active, and when the voltage at the first node 150 is less than the voltage at the second node 151 by a threshold amount. In some configurations, the impedance path can be dynamically adjusted to maintain a predetermined voltage difference between the first node 150 and the second node 151.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:
    a system circuit comprising a positive lead for receiving power at a first node from a first output of an external power source;
    at least one battery comprising a positive lead for receiving power at a second node from a second output of the external power source;
    a controlled resistor comprising a first lead coupled to the first node and a second lead coupled to the second node, the controlled resistor causing a high impedance path between the first node and the second node when the controlled resistor is off, the controlled resistor causing a low impedance path between the first node and the second node when the controlled resistor is on, the controlled resistor further comprising an input for turning the controlled resistor on or off; and
    a control circuit having a first input coupled to the first node, a second input coupled to the second node, a logical input coupled to a component configured to cause a logical signal at the logical input indicating that the external power source is active or inactive, and the control circuit comprising a control output coupled to the input of the controlled resistor,
    the control circuit causing the controlled resistor to be on when the logical signal at the logical input indicates that the external power source is inactive,
    the control circuit causing the controlled resistor to be off when the logical signal at the logical input indicates that the external power source is active, and when a first signal at the first input and a second signal at the second input fulfill a first criteria, wherein the first criteria are fulfilled when a voltage of the first signal is within a first threshold of a voltage of the second signal, and
    the control circuit causing the controlled resistor to be on when the logical signal at the logical input indicates that the external power source is active, and when the first signal at the first input and the second signal at the second input fulfill a second criteria, wherein the second criteria are fulfilled when the voltage of the first signal is below the voltage of the second signal by at least a second threshold.

2. The apparatus of claim 1, wherein the first criteria are fulfilled when a voltage of the first signal is within a first threshold of a voltage of the second signal, wherein the second criteria are fulfilled when the voltage of the first signal is below the voltage of the second signal by at least a second threshold.

3. The apparatus of claim 2, when the voltage of the first signal is below the voltage of the second signal, the control circuit causes the controlled resistor to gradually transition from the high impedance path between the first node and the second node to the low impedance path between the first node and the second node as a difference between the voltage of the first signal and the voltage of the second signal increases.

4. The apparatus of claim 2, wherein the first threshold and the second threshold are within a range of zero volts to one hundred millivolts.

5. The apparatus of claim 2, wherein the first threshold and the second threshold are within a range of 35 millivolts to 45 millivolts.

6. The apparatus of claim 2, when the voltage of the first signal is below the voltage of the second signal, the control circuit causes the controlled resistor to vary a level of impedance between the first node and the second node to maintain a predetermined voltage difference between the voltage of the first signal and the voltage of the second signal.

7. The apparatus of claim 1, wherein the first criteria are fulfilled when a current between the external power source and the system circuit is below a threshold, and wherein the second criteria are fulfilled when the current between the external power source and the system circuit above the threshold.

8. The apparatus of claim 1, wherein the first criteria are fulfilled when a current between the external power source and the at least one battery is flowing in a first direction, and wherein the second criteria are fulfilled when the current between the external power source and the at least one battery is flowing in a second direction.

9. The apparatus of claim 1, wherein the controlled resistor comprises a field-effect transistor, wherein a gate of the transistor is coupled to the control output of the control circuit, a source of the field-effect transistor is coupled to the first node, and a drain of the field-effect transistor is coupled to the second node.

10. The apparatus of claim 9, wherein the control circuit causes the field-effect transistor to control a level of impedance between the second node and the first node to maintain a threshold voltage difference between the first node and second node.

* * * * *